Dec. 18, 1923.

A. VON ARX

CHAIN LOCK

Filed May 5, 1922

1,477,858

Inventor:—
Adolf von Arx
by his attorney

Patented Dec. 18, 1923.

1,477,858

UNITED STATES PATENT OFFICE.

ADOLF von ARX, OF NIEDERUZWIL, SWITZERLAND.

CHAIN LOCK.

Application filed May 5, 1922. Serial No. 558,579.

*To all whom it may concern:*

Be it known that I, ADOLF VON ARX, a citizen of the Swiss Confederation, residing at Niederuzwil, Switzerland, have invented certain new and useful Improvements in Chain Locks, of which the following is a specification.

This invention relates to a chain lock which is suitable for the connection of chains of any kind, such as for instance draught-chains, neck-chains for animals, drag chains, collar chains or the like. This chain lock permits an easy connection even of chains which are under tension, the accidental unlocking being impossible.

According to the invention one arm is at one end to be attached to the chain, an oscillable arm being hingedly connected with the other end, another chain end being attached between the two arms. Means are further provided to lock the arm in the locking position.

In order that the invention may be clearly understood, I shall proceed to describe the same with reference to the form of construction shown by way of example on the accompanying drawing, wherein:—

Figure 1:
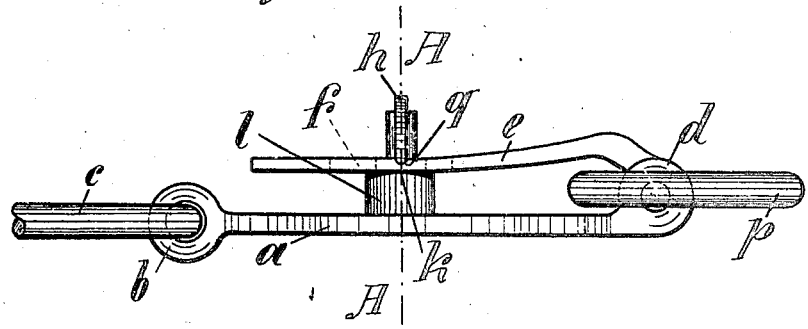

Fig. 1 is a side elevation.

Figure 2:
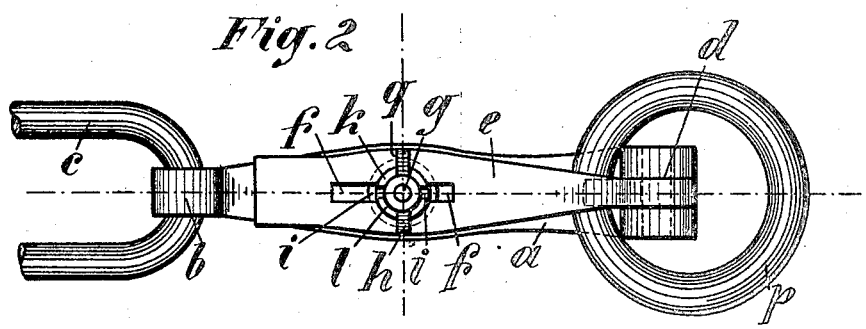

Fig. 2 a top plan, and

Figure 3:
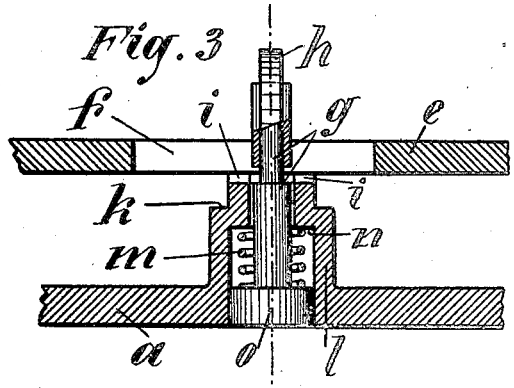

Fig. 3 a section on line A—A of Fig. 1 on enlarged scale.

The arm $a$ of iron or of steel has an eyelet $b$ at one end in which the end link $c$ of a chain is fixed. An arm $e$ is oscillably connected with the other end of arm $a$ by means of a hinge $d$. This arm $e$ has a longitudinal slot $f$ traversed by a bolt $g$. This bolt, adapted to be moved up and down, has at its upper end a handle $h$ adapted to engage with two grooves $i$ arranged opposite one another, in the casing or boss $l$. In arm $e$ grooves $q$ are arranged at right angles to the slot of and the handle $h$ can engage with these grooves $q$ if it is in the locking position. The casing $l$, which is off set at $k$ is fixed upon the arm $a$ and serves to guide the bolt $g$ which is controlled by a spring $m$. The spiral spring $m$ bears with one end against the shoulder $n$ formed by the off set $k$ of the casing $l$ and with the other end upon the head $o$ of bolt $g$. This head $o$ of bolt $g$ engages with a hole in arm $a$. By the action of spring $m$ the bolt $g$ is pressed downward, whereby a handle $h$ is held in engagement with the grooves $i$ or with the grooves $q$ so that it cannot rotate accidentally. A ring $p$ which forms the end of a second chain is inserted between the arms $e$ and $a$.

To open the lock it is only necessary to turn by hand the handle $h$ so that it registers with the slot $f$. In this position of the handle the arm $e$ can be lifted and the ring $p$ removed. For attaching the two chain ends, the parts have to be operated inversely.

This chain lock is suitable also for fixing the draught chains of tractors so that they cannot detach themselves accidently, even under heavy shocks and vibrations.

I claim:—

1. An improved chain lock comprising in combination an arm, an eyelet at one end of said arm attached to the end of a chain, a second arm having a longitudinal slot, a hinge for connecting said second arm to the other end of the first mentioned arm so that the end of a second chain can be inserted between said two arms, the first arm having a raised hollow boss beneath the slot of the second arm, resilient means in the boss, and a handle insertable through the slot of the second arm and rotatable and slidable in the boss against said resilient means to be held thereby against disengagement with the second arm.

2. An improved chain lock comprising in combination an arm, an eyelet at one end of said arm attached to the end of a chain, a casing fixed upon said arm, a second arm having a longitudinal slot, a hinge for connecting said second arm to the other end of the first mentioned arm so that the end of a second chain can be inserted between said two arms, a rotatable handle fixed in said first mentioned arm so that it traverses the longitudinal slot of the hinged arm and can be turned to lock said hinged arm in the locking position, and a spring controlled bolt guided in said casing of the first mentioned arm and serving as support for said handle.

In testimony whereof I affix my signature in presence of two witnesses.

ADOLF VON ARX.

Witnesses:
 FISIUK TIMMKE,
 WALTER NECILE.